(12) United States Patent
Neriki et al.

(10) Patent No.: US 8,957,336 B2
(45) Date of Patent: Feb. 17, 2015

(54) LEVER SWITCH

(71) Applicant: Panasonic Corporation, Osaka (JP)

(72) Inventors: Nobuaki Neriki, Fukui (JP); Hisashi Nishikawa, Shiga (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 166 days.

(21) Appl. No.: 13/742,444

(22) Filed: Jan. 16, 2013

(65) Prior Publication Data
US 2013/0180836 A1    Jul. 18, 2013

(30) Foreign Application Priority Data

Jan. 17, 2012  (JP) ................................. 2012-006700

(51) Int. Cl.
| H01H 9/00 | (2006.01) |
| H01H 3/04 | (2006.01) |
| H01H 13/14 | (2006.01) |
| H01H 1/40 | (2006.01) |
| H01H 23/16 | (2006.01) |
| B60Q 1/14 | (2006.01) |
| H01H 23/02 | (2006.01) |

(52) U.S. Cl.
CPC ............... *H01H 3/04* (2013.01); *H01H 13/14* (2013.01); *H01H 1/403* (2013.01); *H01H 23/168* (2013.01); *B60Q 1/1484* (2013.01); *H01H 23/025* (2013.01)
USPC ...................................................... 200/61.54

(58) Field of Classification Search
USPC ......... 200/61.54, 5 R, 6 R, 19.18, 19.07, 564, 200/252, 339
See application file for complete search history.

(56) References Cited

U.S. PATENT DOCUMENTS 7,439,459 B2 * 10/2008 Hyun et al. ................... 200/5 R

FOREIGN PATENT DOCUMENTS

JP    2006-260852    9/2006

* cited by examiner

*Primary Examiner* — Edwin A. Leon
*Assistant Examiner* — Anthony R. Jimenez
(74) *Attorney, Agent, or Firm* — Panasonic Patent Center

(57) ABSTRACT

A lever switch includes a case, a lever, a wiring board, a sliding body, and a movable contact. The wiring board has fixed contacts and is disposed at an opposite side to the lever with respect to the case. The sliding body has a sliding part and a second arm part having a supporting portion, and is disposed between the case and the wiring board. The movable contact is mounted to the sliding part and has an end to be brought into contact with the fixed contact. A first arm part of the lever extends from the main body part through the case and the wiring board. The second arm part extends from the wiring board through the sliding part. The holding portion and the supporting portion are engaged with each other at an opposite side to the case with respect to the wiring board.

11 Claims, 8 Drawing Sheets

LEVER SWITCH

1. TECHNICAL FIELD

The technical field relates to a lever switch mainly used for operations of various electronic equipment in a vehicle.

2. BACKGROUND ART

Recently, switches, which are mounted on a steering wheel, an instrument panel, or the like, in a vehicle and used for operating electronic equipment such as acoustic equipment, air-conditioning equipment and a speed device in a vehicle, have been used.

SUMMARY

A lever switch includes a case, a lever, a wiring board, a sliding body, and a movable contact. The lever includes an operating part, a main body part, and a first arm part having a holding portion at a tip thereof. The main body part is rotatably mounted to the case. The wiring board has a fixed contact, and is disposed at an opposite side of the case with respect to the operating part. The sliding body includes a sliding part, and a second arm part having a supporting portion at a tip thereof, and is disposed between the case and the wiring board. The movable contact is mounted to the sliding part and has an end to be brought into contact with the fixed contact. The first arm part extends from the main body part through the case and the wiring board. The second arm part extends from the sliding part through the wiring board. The holding portion and the supporting portion are engaged with each other at an opposite side to the case with respect to the wiring board.

DETAILED DESCRIPTION

Figure 12:
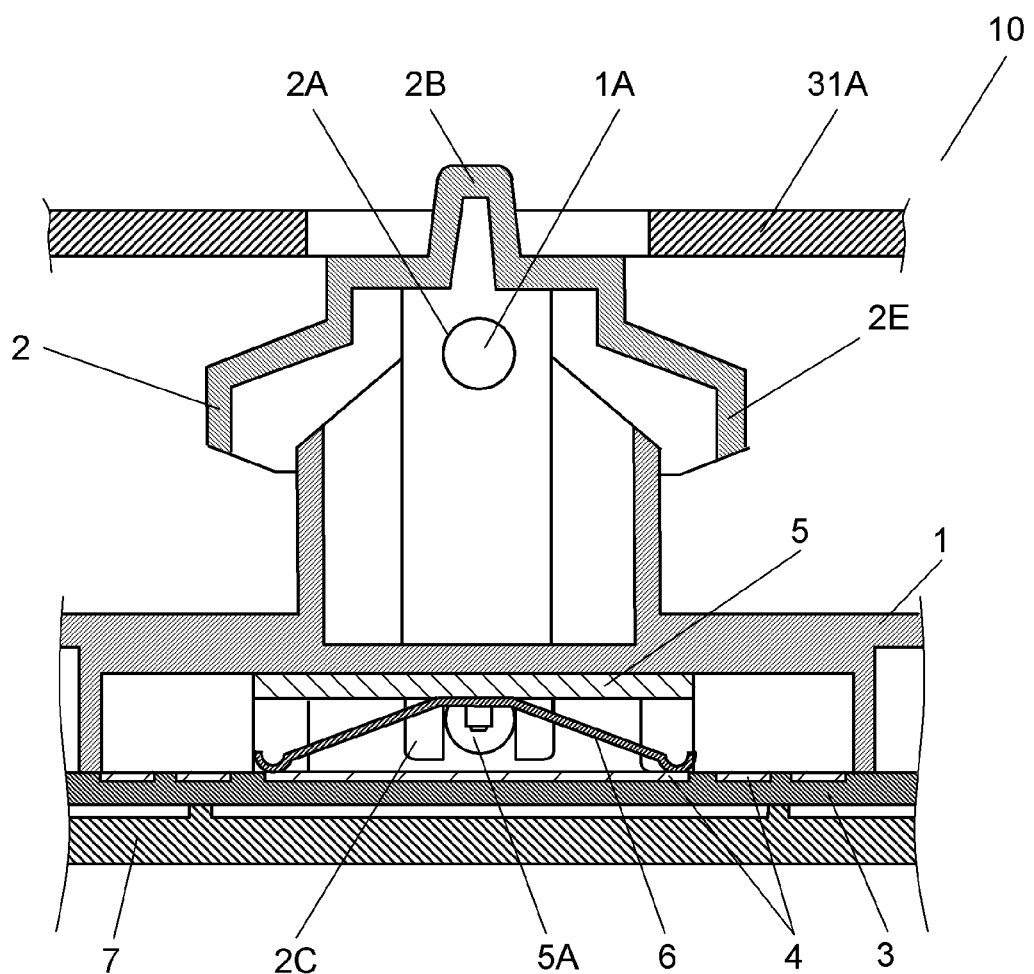
FIG. 12 is a sectional view of a conventional lever switch.

A conventional lever switch is described with reference to FIGS. 12 and 13. FIG. 12 is a sectional view of a conventional lever switch. Lever 2 is rotatably mounted on shaft part 1A at the upper side of case 1 with shaft hole 2A as a fulcrum. Lever 2 is made of insulating resin, and case 1 has a substantially box-shape and is made of insulating resin. Furthermore, operating part 2B of lever 2 projects upward from main body part 2E.

A plurality of wiring patterns (not shown) are formed on the upper and lower surfaces of wiring board 3. Wiring board 3 is disposed below case 1. A plurality of fixed contacts 4 made of a copper alloy, carbon, or the like, are formed on the upper surface of wiring board 3.

Sliding body 5 made of insulating resin is placed above wiring board 3. Cut-away shaped holding portion 2C formed at the lower end of lever 2 is engaged with substantially columnar-shaped supporting portion 5A that projects from sliding body 5.

A middle portion of movable contact 6 made of a copper alloy, a steel plate, or the like, is fixed to the lower surface of sliding body 5. Both ends of movable contact 6 are brought into elastic contact with the upper surface of facing fixed contact 4 or wiring board 3 in a state in which they are slightly bend.

Cover 7 made of insulating resin covers the lower surfaces of case 1 and wiring board 3. The lever switch 10 is configured as mentioned above.

Figure 13:
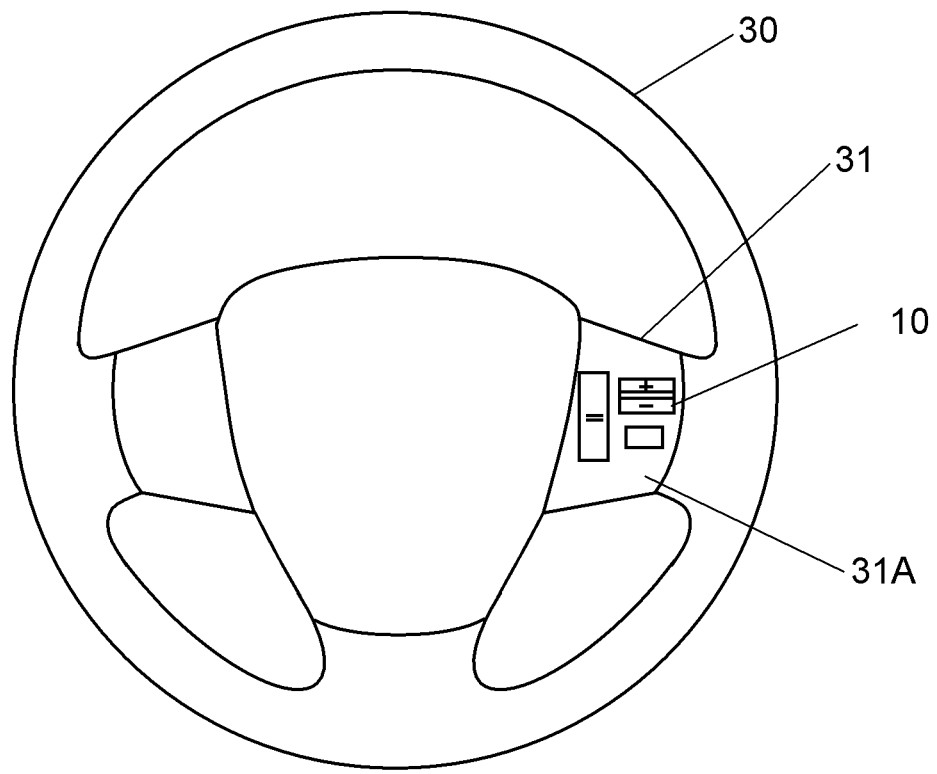
FIG. 13 is a front view of a conventional steering wheel.

FIG. 13 is a front view of a conventional steering wheel. Lever switch 10 is installed on, for example, spoke 31 of steering wheel 30 in a vehicle. Operating part 2B of lever switch 10 is mounted in a vehicle in a state in which it projects from panel 31A. A plurality of fixed contacts 4 are electrically coupled to an electronic circuit (not shown) of a vehicle via a wiring pattern, a lead wire (not shown), or the like.

For example, an operator stretches the thumb while holding steering wheel 30 shown in FIG. 13 so as to operate to rock operating part 2B in the upper or lower direction (in the right or left direction in FIG. 12). Then, lever 2 is rocked with shaft hole 2A as a fulcrum, and sliding body 5, with which holding portion 2C on the lower end of lever 2 is engaged, slides in the right or left direction opposite to the rocking direction of lever 2.

Then, both ends of movable contact 6 fixed to the lower surface of sliding body 5 elastically slide on wiring board 3. When operating part 2B is operated to be rocked to a predetermined position, electrical connection and disconnection of fixed contact 4 are carried out via movable contact 6. As a result, an electric signal is output to an electronic circuit of a vehicle, and, for example, a temperature of an air conditioner is increased or decreased by only 1° C.

When an operator further carries out a rocking operation in the same direction while the operator keeps the finger on operating part 2B, sliding body 5 slides further outward on wiring board 3 so that electrical connection and disconnection of outer fixed contact 4 are carried out. This is detected by the electronic circuit, and, for example, a temperature of the air conditioner is increased or decreased by 5° C.

That is to say, different fixed contacts 4 are electrically connected and disconnected depending upon whether lever 2 is operated to a predetermined middle position or to the maximum position. Each of them is detected by the electronic circuit, and thereby operations of equipment, for example, increasing or decreasing of the temperature of the air conditioner or a sound volume of an audio system, or a speed of the speed device, are carried out.

Since lever switch 10 is mounted on steering wheel 30, an operator can control various equipment in a vehicle by operating to rock operating part 2B to the middle position or the maximum position by stretching only the thumb without taking the hand off steering wheel 30. This enables the operator to easily operate equipment during driving.

In a conventional lever switch, lever 2 is operated to be rocked to a middle position and a maximum position, so that electrical connection and disconnection of fixed contact 4 via movable contact 6 are carried out in each position. Therefore, in order to carry out reliable electrical connection and disconnection of fixed contact 4, it is necessary to slide sliding body 5 having movable contact 6 on the lower surface thereof largely to some extent in the left and right direction. For this reason, a dimension from shaft hole 2A as a rocking fulcrum of lever 2 to holding portion 2C that is engaged with supporting portion 5A on the side surface of sliding body 5 is increased.

Hereinafter, an embodiment is described with reference to FIGS. 1 to 11.

Embodiment

Figure 1:
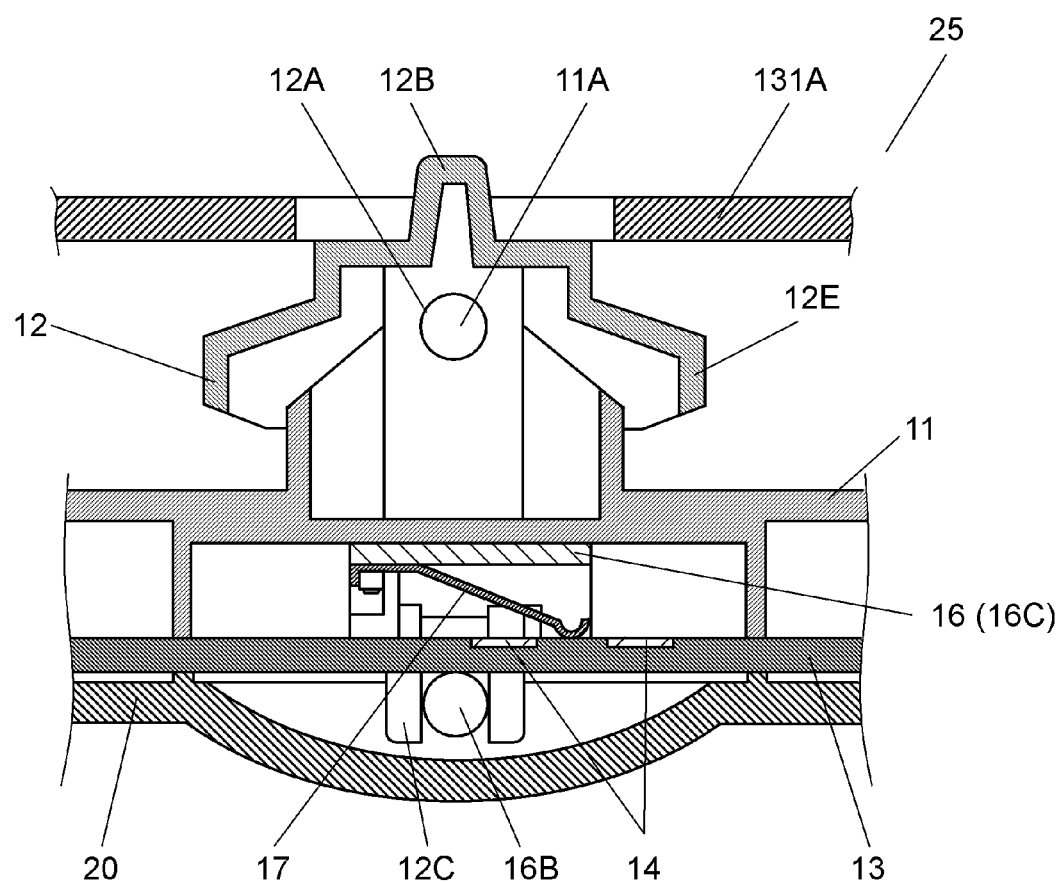
FIG. 1 is a sectional view of a lever switch in accordance with an embodiment.
Figure 2:
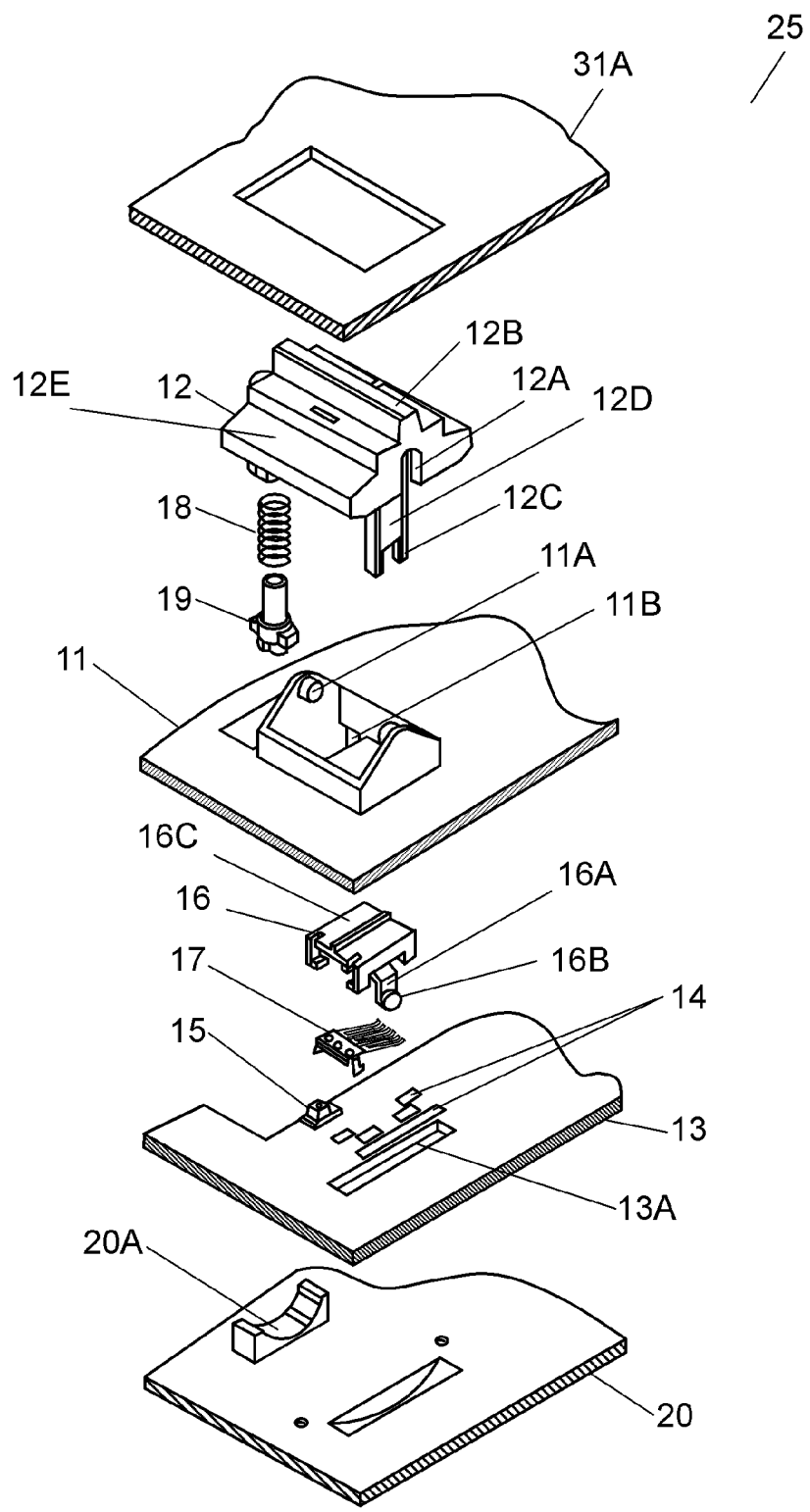
FIG. 2 is an exploded perspective view of the lever switch in accordance with the embodiment.
Figure 3:
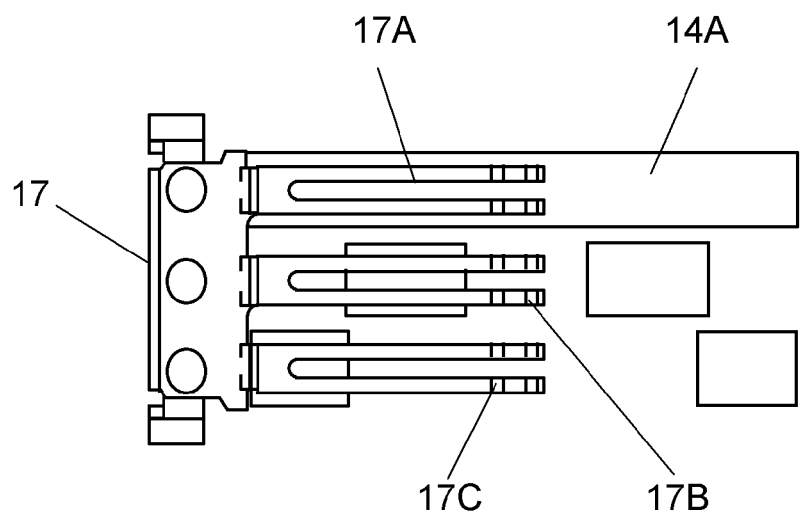
FIG. 3 is a plan view showing a connection state between a movable contact and a fixed contact of the lever switch in accordance with the embodiment.
Figure 4:
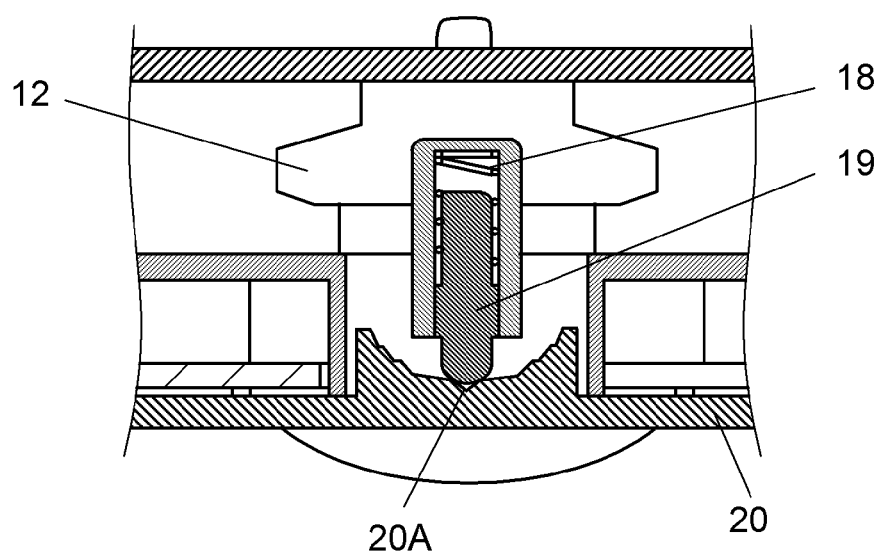
FIG. 4 is a sectional view showing a relation between a pin and a click part of the lever switch in accordance with the embodiment.

FIG. 1 is a sectional view of a lever switch in accordance with an embodiment. FIG. 2 is an exploded perspective view of the lever switch in accordance with the embodiment. FIG. 3 is a plan view showing a connection state between a movable contact and a fixed contact of the lever switch in accordance with the embodiment. FIG. 4 is a sectional view showing a relation between a pin and a click part of the lever switch in accordance with the embodiment.

Lever switch 25 includes case 11, lever 12, wiring board 13, sliding body 16, and movable contact 17. Lever 12 includes operating part 12B, main body part 12E, and arm part 12D (first arm part) having holding portion 12C at a tip thereof. Main body part 12E is rotatably mounted to case 11. Wiring board 13 includes fixed contact 14, and is disposed at an opposite side of case 11 with respect to operating part 12B. Siding body 16 includes sliding part 16C and arm part 16A (second arm part) having supporting portion 16B at a tip thereof, and is disposed between case 11 and wiring board 13. Movable contact 17 is mounted to sliding part 16C and an end thereof is brought into contact with one of fixed contacts 14. Arm part 12D extends from main body part 12E through case 11 and wiring board 13. Arm part 16A extends from sliding part 16C through wiring board 13. Holding portion 12C and supporting portion 16B are engaged with each other at an opposite side to case 11 with respect to wiring board 13.

Lever 12 is rotatably mounted to shaft part 11A on the inner wall of the upper part of substantially box-shaped case 11 with shaft hole 12A as a fulcrum.

Lever 12 includes operating part 12B, main body part 12E and arm part 12D (first arm part). Operating part 12B of lever 12 projects upward from main body part 12E. Arm part 12D of lever 12 extends downward through through-hole 11B of case 11. Cut-away shaped holding portion 12C is formed on the lower end (tip) of arm part 12D. Case 11 is formed of insulating resin such as polyoxymethylene resin, ABS resin, or the like. Lever 12 is formed of insulating resin such as polycarbonate resin, ABS resin, or the like.

Furthermore, wiring board 13 is made of paper phenol, glass-containing epoxy, or the like. A plurality of wiring patterns (not shown) of, for example, copper foil, are formed on the upper and lower surfaces of wiring board 13. Wiring board 13 is disposed below case 11. A plurality of fixed contacts 14 made of a copper alloy, carbon, or the like, are formed on the upper surface of wiring board 13.

Light-emitting device 15 such as a light-emitting diode is packaged and mounted with its light-emitting surface facing upward on the upper surface of wiring board 13. In wiring board 13, a rectangular-shaped through-hole 13A is provided in the vicinity of fixed contact 14.

Sliding body 16 is disposed between case 11 and wiring board 13. Sliding body 16 includes sliding part 16C and arm part 16A (second arm part). Arm part 16A is formed on the side surface of sliding part 16C. Sliding body 16 is formed of insulating resin such as polyoxymethylene resin and polybutylene terephthalate resin. Arm part 16A extends downward through through-hole 13A of wiring board 13. Arm part 12D of lever 12 extends downward through through-hole 11B and through-hole 13A. Substantially columnar-shaped supporting portion 16B is formed on the lower end (tip) of arm part 16A. Supporting portion 16B is engaged with cut-away shaped holding portion 12C provided at the lower end of lever 12 below wiring board 13.

Movable contact 17 is fixed to the lower surface of sliding body 16. Contact portions 17A, 17B, and 17C are formed on the end of movable contact 17 (see, FIG. 3). Movable contact 17 is formed of a copper alloy, a steel plate, or the like. Contact portion 17A is brought into elastic contact with a facing fixed contact 14A in a state in which it slightly bends. Contact portions 17B and 17C are brought into elastic contact with the upper surface of wiring board 13.

Pin 19 is housed at a lower surface of lever 12 in a state in which pin 19 somewhat compresses spring 18. Spring 18 is formed of a copper alloy or a steel wire, and wound in a coil shape. Pin 19 has a substantially columnar shape, and is formed of insulating resin such as polyoxymethylene resin and polybutylene terephthalate resin.

Cover 20 covers the lower surfaces of case 11 and wiring board 13. Cover 20 is formed of insulating resin such as polybutylene terephthalate resin and polyoxymethylene resin. Click part 20A, which has a plurality of protrusions on a curved surface thereof on which pin 19 slides, is provided on the upper surface of cover 20. Click part 20A is brought into elastic contact with a lower end (a tip) of pin 19. The lever switch 25 is configured as mentioned above.

In a state shown in FIG. 1 in which lever 12 stands upright, the lower end of pin 19 energized by spring 18 is brought into elastic contact with the concave portion on the bottom surface of click part 20A, so that a neutral position of lever 12 is kept as shown in FIG. 4.

Figure 5:
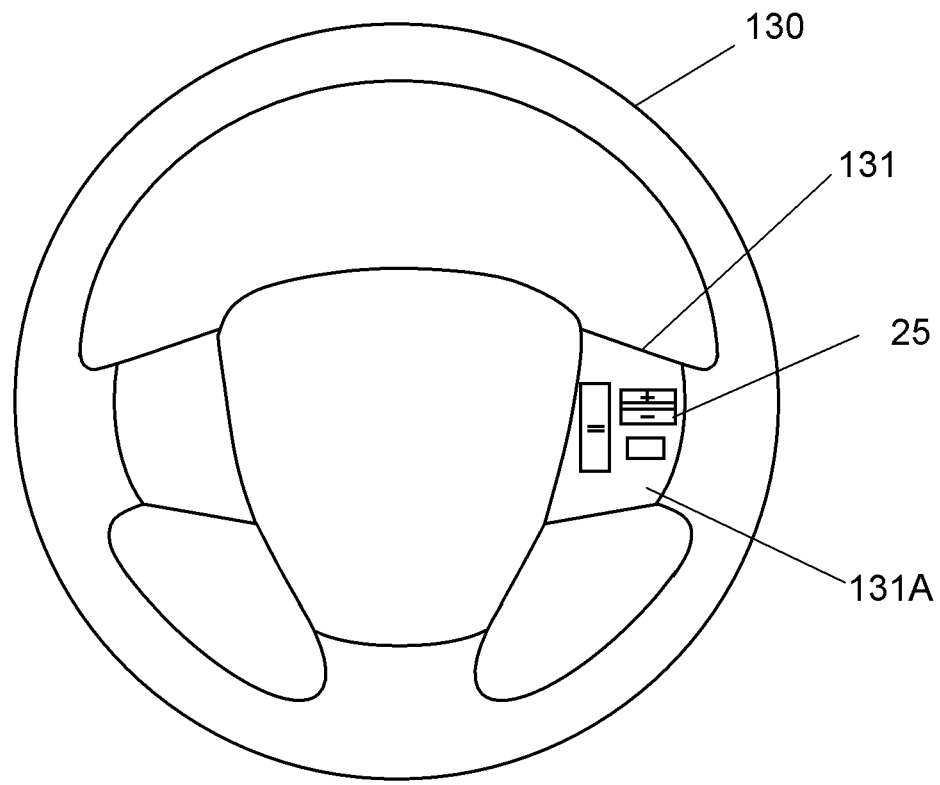
FIG. 5 is a front view of a steering wheel in accordance with the embodiment.
Figure 6:
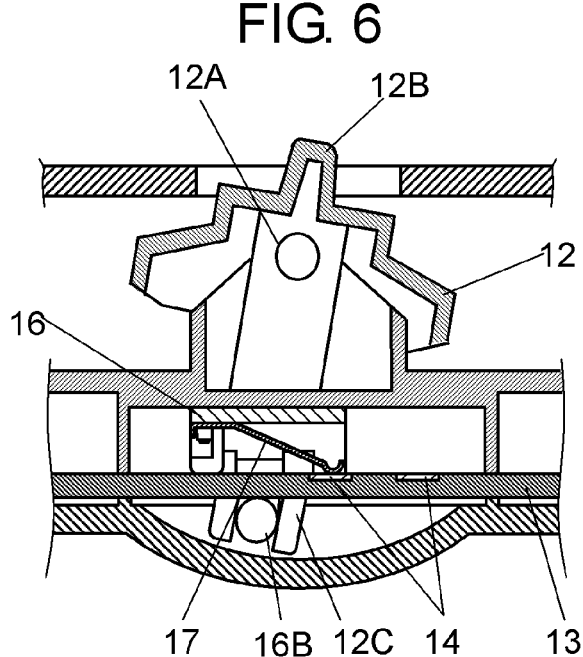
FIG. 6 is a sectional view of the lever switch in accordance with the embodiment.
Figure 7:
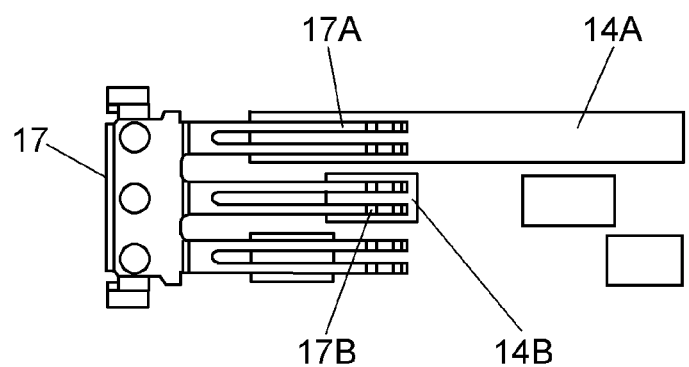
FIG. 7 is a plan view showing a connection state between the movable contact and the fixed contact of the lever switch in accordance with the embodiment.
Figure 8:
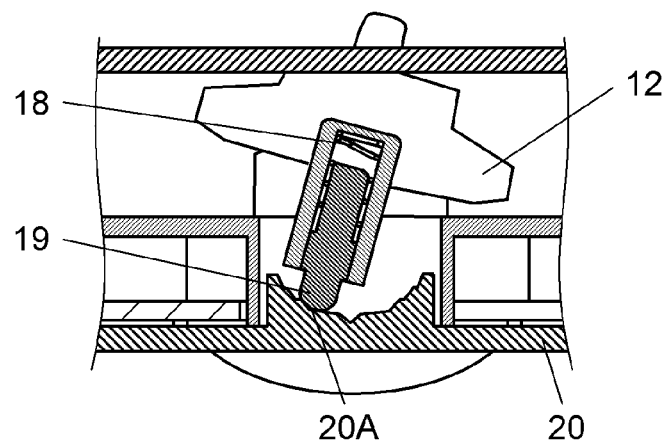
FIG. 8 is a sectional view showing a relation between the pin and the click part of the lever switch in accordance with the embodiment.
Figure 9:
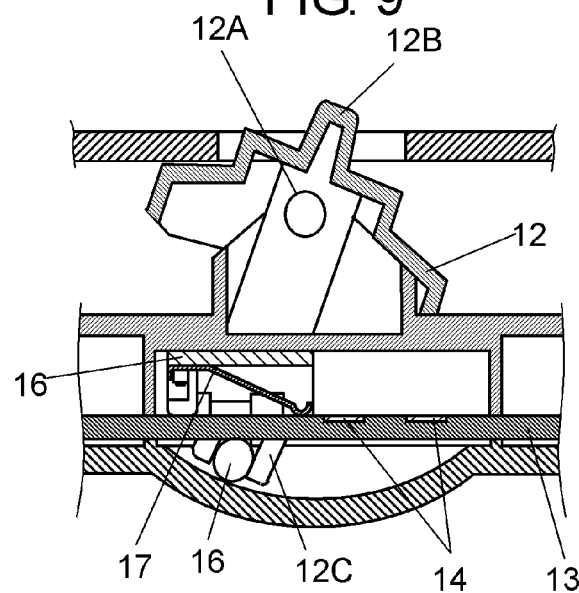
FIG. 9 is a sectional view showing the lever switch in accordance with the embodiment.
Figure 10:
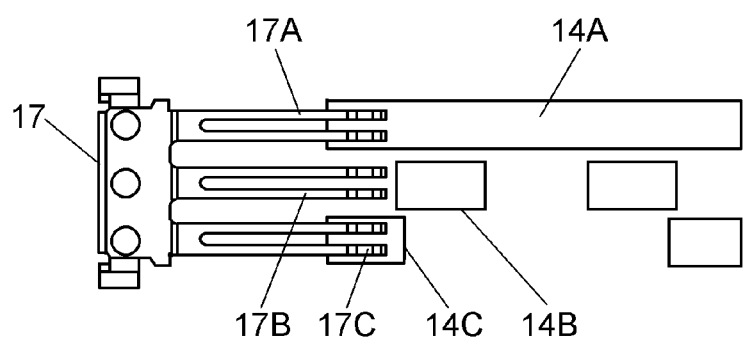
FIG. 10 is a plan view showing a connection state between the movable contact and the fixed contact of the lever switch in accordance with the embodiment.
Figure 11:
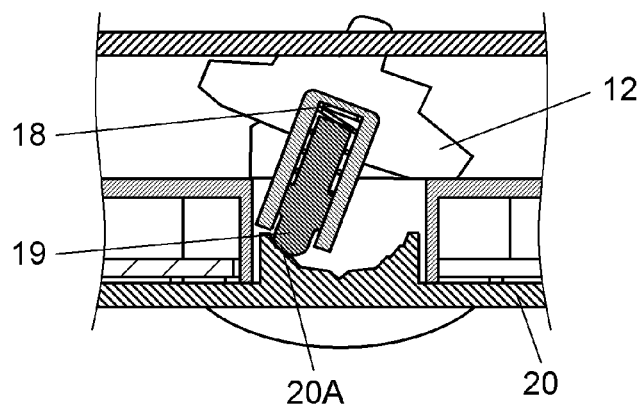
FIG. 11 is a sectional view showing a relation between the pin and the click part of the lever switch in accordance with the embodiment.

FIG. 5 is a front view of a steering wheel in accordance with the embodiment. FIG. 6 is a sectional view of the lever switch in accordance with the embodiment. FIG. 7 is a plan view showing a connection state between the movable contact and the fixed contact of the lever switch in accordance with the embodiment. FIG. 8 is a sectional view showing a relation between the pin and the click part of the lever switch in accordance with the embodiment. FIG. 9 is a sectional view showing the lever switch in accordance with the embodiment. FIG. 10 is a plan view showing a connection state between the movable contact and the fixed contact of the lever switch in accordance with the embodiment. FIG. 11 is a sectional view showing a relation between the pin and the click part of the lever switch in accordance with the embodiment.

Lever switch 25 is installed on, for example, spoke 131 of steering wheel 130 in a vehicle interior as shown in FIG. 5. Operating part 12B of lever switch 25 is mounted in a vehicle in a state in which it projects from panel 131A. A plurality of fixed contacts 14 and light-emitting device 15 are electrically connected to an electronic circuit (not shown) of the vehicle via a wiring pattern, a lead wire, or the like (not shown).

For example, an operator stretches the thumb while holding steering wheel 130 shown in FIG. 5 so as to operate to rock operating part 12B in the upper direction (in the right direction in FIG. 1). Then, lever 12 is rocked with shaft hole 12A as a fulcrum. Since supporting portion 16B of arm part 16A is engaged with holding portion 12C provided at the lower end of lever 12, sliding body 16 slides in the left direction that is opposite to the rocking direction of lever 12 (see FIG. 6).

Since one end of movable contact 17 is fixed to the lower surface of sliding body 16, the other end of movable contact 17 elastically slides on wiring board 13. When operating part 12B is operated to be rocked to a predetermined position, contact portion 17B is brought into elastic contact with fixed contact 14B as shown in FIG. 7, and fixed contacts 14A and 14B are brought into contact with each other via movable contact 17. As a result, the electric signal is output to an electronic circuit of a vehicle, and, for example, a speed of a speed device set to a so-called auto-cruise in which a vehicle drives at a predetermined speed is increased by only 1 km/h.

Furthermore, at this time, as shown in FIG. 8, the lower end of pin 19 energized by spring 18 elastically slides on click part 20A and is brought into elastic contact with the concave portion at the middle portion of click part 20A. Thus, click feeling at the middle position is generated.

When an operator continuously carries out a rocking operation in the right direction while the operator keeps the finger on operating part 12B, sliding body 16 further slides in the left direction on the upper part of wiring board 13 as shown in FIG. 9. When the operator operates operating part 12B to a maximum position, contact portion 17B is apart from fixed contact 14B and is brought into elastic contact with wiring board 13 as shown in FIG. 10. At the same time, contact portion 17C is brought into elastic contact with fixed contact 14C, and fixed contacts 14A and 14C are connected to each other via movable contact 17. This is detected by an electronic circuit, and the speed of the speed device set to, for example, an auto-cruise, is increased by 5 km/h.

Furthermore, at this time, as shown in FIG. 11, the lower end of pin 19 energized by spring 18 elastically slides further upward on click part 20A, and is brought into elastic contact with a concave portion of the upper part of click part 20A. Thus, click feeling at the maximum position is generated.

When an operator takes off the finger from operating part 12B after the operator operates to rock lever 12 to the middle position or the maximum position as mentioned above, the lower end of pin 19 energized by spring 18 elastically slides on click part 20A, and pin 19 returns to a state in which it is brought into elastic contact with the concave portion of the bottom surface of click part 20A. Consequently, sliding body 16 and movable contact 17 return to the middle position, and lever 12 is held in the neutral position shown in FIG. 1 or 4.

Furthermore, on the contrary to the above, when operating part 12B is operated to be rocked in the left direction, sliding body 16 slides in the right direction, and electrical connection and disconnection of fixed contact 14 at the right side are carried out via movable contact 17. At the same time, the lower end of pin 19 energized by spring 18 elastically slides on click part 20A, so that click feeling at the middle position or the maximum position is generated.

Then, the electronic circuit detects electrical connection and disconnection of fixed contact 14, and the speed of the speed device set to, for example, an auto-cruise, is reduced by 1 km/h when the operation is carried out to the middle position, and the speed is reduced by 5 km/h when the operation is carried out to the maximum position.

When the surrounding is dark, for example, at night or inside a tunnel, an operator operates a combination switch (not shown) that is additionally mounted in the vicinity of the steering wheel. Then, this operation is detected by an electronic circuit of a vehicle, and light-emitting device 15 on the upper surface of wiring board 13 is allowed to emit light.

Then, the light from light-emitting device 15 travels upward, and illuminates the vicinity of operating part 12B of lever 12 from the lower side, thereby facilitating discrimination or operation of operating part 12B.

Since lever switch 25 is mounted on steering wheel 130, an operator can operate to rock operating part 12B to the middle position or the maximum position by, for example, stretching only the thumb without taking the hand off steering wheel 130, so that various apparatuses in a vehicle can be controlled. Thus, the operator can easily operate apparatuses during driving.

As mentioned above, in lever switch 25, lever 12 is operated to be rocked to the middle position and the maximum position so as to carry out electrical connection and disconnection with respect to fixed contact 14 via movable contact 17 at each position. In order to carry out reliable electrical connection and disconnection of fixed contact 14, it is necessary to slide sliding body 16 provided with movable contact 17 on the lower part thereof in the right and left direction largely to some extent. Therefore, a dimension from shaft hole 12A as a rocking fulcrum of lever 12 to holding portion 12C is increased. In this embodiment, however, supporting portion 16B extending to the lower side of wiring board 13 is provided in sliding body 16, and supporting portion 16B is allowed to be engaged with holding portion 12C. Thereby, a dimension from panel 131A to wiring board 13 can be reduced.

That is to say, in this embodiment, even when the dimension from shaft hole 12A as the rocking fulcrum of lever 12 to holding portion 12C is large, wiring board 13 provided with a plurality of fixed contacts 14 on the upper surface thereof is formed on the upper side from supporting portion 16B or holding portion 12C. Consequently, the height can be reduced by a portion corresponding to supporting portion 16B or holding portion 12C.

In conventional lever switch 10, as shown in FIG. 12, supporting portion 5A and holding portion 2C are formed above wiring board 3. On the other hand, as shown in FIG. 1, in lever switch 25 of this embodiment, supporting portion 16B and holding portion 12C are formed below wiring board 13. Therefore, even when the dimension from shaft hole 12A to holding portion 12C is increased, the dimension from panel 131A to wiring board 13 can be reduced by a portion corresponding to supporting portion 16B or holding portion 12C extending downward through through-hole 13A. Therefore, the height of the upper part from wiring board 13 can be reduced, and thus the size can be reduced.

Furthermore, in the configuration of this embodiment, one end of movable contact 17 is fixed to the lower surface of sliding body 16, and contact portions 17A, 17B, and 17C at the other end are brought into contact with fixed contact 14. Therefore, as compared with conventional movable contact 6 in which the middle portion is fixed to the lower surface of sliding body 5 and both ends are brought into contact with the facing fixed contact 4, the dimension in the right and left direction can be reduced.

Furthermore, light-emitting device 15 for illuminating the vicinity of operating part 12B of lever 12 from below is packaged and mounted on the upper surface of wiring board 13, and an air-gap is formed on the upper side of light-emitting device 15. Therefore, even if the other component such as a light-guiding body is not used, lever 12 can be brightly illuminated directly from below.

Note here that in the above description, a configuration in which wiring board 13 is provided with rectangular shaped through-hole 13A, and arm part 16A extending downward from the side surface of sliding part 16C is allowed to pass through through-hole 13A, and supporting portion 16B is provided on the lower side of wiring board 13 is described. However, a configuration in which a cut-away portion instead of through-hole 13A is provided, or a configuration in which arm part 16A is allowed to extend downward from the side surface of wiring board 13, or a configuration in which the upper end of supporting portion 16B somewhat projects from the upper surface of wiring board 13 may be employed.

Furthermore, the configuration is described in which by using lever switch 25 for operations of a speed device, the speed of the speed device set to, for example, an auto-cruise, is increased or decreased by only 1 km/h when lever 12 is operated to be rocked to the middle position, and the speed is increased or decreased by 5 km/h when lever 12 is operated to be rocked to the maximum position. However, lever switch 25 may be used for operations of an air conditioner or an audio system, that is, for example, operations for increasing and decreasing a temperature of the air conditioner by only 1° C. when lever 12 is operated to be rocked to the middle position, and increasing and decreasing the temperature by 5° C. when lever 12 is operated to be rocked to the maximum position.

Furthermore, in the above description, wiring board 13 having a plurality of wiring patterns on the upper and lower surfaces is described. However, in this embodiment, a plurality of fixed contacts 14 for carrying out electrical connection and disconnection by movable contact 17 whose one end is fixed to the lower surface of sliding body 16 are formed on the upper surface of wiring board 13. Furthermore, light-emitting device 15 for illuminating lever 12 from below is mounted on the upper surface of wiring board 13. Therefore, a so-called one-side wiring board having a wiring pattern on the upper surface thereof may be used. When a one-side wiring board is used, inexpensive lever switch 25 can be formed.

Furthermore, instead of a substantially columnar-shaped pin 19 made of insulating resin, for example, a hard ball may be used and energized to click part 20A by spring 18, thereby generating click feeling in the middle position or the maximum position.

In this way, according to this embodiment, sliding body 16 has arm part 16A extending to the lower side of wiring board 13, and supporting portion 16B is formed at a tip of arm part 16A. Furthermore, lever 12 rotatably mounted to case 11 has arm part 12D extending to the lower side of wiring board 13, and holding portion 12C that is to be engaged with supporting portion 16B is provided on the lower end of arm part 12D. Thus, sliding body 16 can be allowed to largely slide in the right and left direction. Therefore, even if a dimension from shaft hole 12A as a rocking fulcrum of lever 12 to supporting portion 16B is increased, a dimension from panel 131A to wiring board 13 can be reduced by a portion in which supporting portion 16B of sliding body 16 extends to the lower side of wiring board 13. Consequently, the height of a portion upper than wiring board 13 can be lowered, and the size can be reduced. Furthermore, a lever switch capable of carrying out a reliable operation can be obtained.

A lever switch of this embodiment has advantageous effects that the size is small and a reliable operation can be carried out, and is useful for operations of various electronic equipment in a vehicle.

What is claimed is:

1. A lever switch comprising:
a case;
a lever having an operating part, a main body part, and a first arm part having a holding portion at a tip thereof, the main body part being rotatably mounted to the case;
a wiring board being disposed at an opposite side of the case with respect to the operating part, and having a fixed contact at a side of the operating part;
a sliding body having a sliding part, and a second arm part having a supporting portion at a tip thereof and being slidably disposed between the case and the wiring board; and
a movable contact mounted to the sliding part and having an end to be brought into contact with the fixed contact, wherein
the first arm part extends from the main body part through the case and the wiring board,
the second arm part extends from the sliding part through the wiring board,
the supporting portion is located at an opposite side of the wiring board with respect to the sliding part,
the holding portion and the supporting portion are engaged with each other at an opposite side of the case with respect to the wiring board, and
when the lever rotates, the holding portion and the supporting portion move, and the sliding body slides on the wiring board.

2. The lever switch of claim 1,
wherein the end of the movable contact has a plurality of contact portions including a first contact portion and a second contact portion,
the fixed contact is one of a plurality of fixed contacts including a first fixed contact and a second fixed contact,
the first contact portion is brought into contact with the first fixed contact, and
the movable contact is disposed relative to the fixed contact such that the second contact portion is brought into contact with the second fixed contact when the lever is operated and the plurality of contact portions slide on the wiring board.

3. The lever switch of claim 1, further comprising:
a pin mounted to the lever and penetrating the case;
a cover for covering an opposite side of the case with respect to the wiring board; and
a click part formed on the cover and having a curved surface provided with a plurality of protrusions,
wherein a tip of the pin and the click part are brought into elastic contact with each other.

4. The lever switch of claim 3,
wherein a position in which the tip of the pin and the click part are brought into contact with each other is changed by an operation of the lever.

5. The lever switch of claim 1, further comprising a light-emitting device formed on the wiring board.

6. A steering wheel for a vehicle, comprising:
the lever switch of claim 1; and
one or more wiring patterns for electrically coupling the lever switch to an electronic circuit in an automotive vehicle.

7. A lever switch comprising:
a case;
a lever, which includes an operating part protruding from a top portion of the case and a holding portion disposed at an opposite end to the operating part, being rotatably mounted in the case;

a wiring board including a fixed contact and being disposed on a bottom portion of the case opposite to the operating part of the lever;

a sliding body coupled to the holding portion of the lever at a position protruding in an opposite direction to the operating part from the case and the wiring board, the sliding body disposed on the wiring board at a side of the operating part, and arranged to move in accordance with rotation of the lever; and a movable contact mounted to the sliding body and arranged to contact the fixed contact of the wiring board based upon the position of the sliding body.

8. The lever switch of claim 7, further comprising:

an elastic member coupled to the lever and configured to return the lever to an initial state, the elastic member coupled to a click part disposed outside of the case.

9. The lever switch of claim 1, wherein one end of the movable contact is fixed to a surface of the sliding body, and the other end of the movable contact elastically slides on the wiring board.

10. The lever switch of claim 1, wherein the holding portion is cut-away shaped and the supporting portion is columnar-shaped.

11. The lever switch of claim 1, wherein the first arm part extends downward from the main body part.

* * * * *